Patented May 29, 1945

2,376,908

UNITED STATES PATENT OFFICE 2,376,908

MATTING LUSTROUS FIBROUS MATERIALS AND AGENTS THEREFOR

Georges de Niederhäusern, Basel, Switzerland, assignor to the firm of Durand & Huguenin S. A., Basel, Switzerland No Drawing. Application January 10, 1941, Serial No. 374,019. In Switzerland January 31, 1940

8 Claims. (Cl. 8—135)

It is known that white pigments can be fixed locally on viscose with the aid of albumen which is caused to coagulate by steaming; in this manner matt effects which are fast to soaping can be produced.

The mattings thus produced, however, have a harsh feel. In order to improve the feel of the matted portions of the material, it has been proposed to add hexamethylenetetramine to the printing colour so that on steaming there shall be produced a condensation product of albumen and formaldehyde which is appreciably more elastic than albumen. The softness of the prints can be further improved by the addition of a particular softening agent (Soromin AF) (see Melliand's Textilberichte, vol. 17, page 249, 1936).

There has not hitherto been known a practicable process whereby matt effects fast to soaping can be produced by fixation of a pigment with the aid of albumen on viscose in the piece by a padding process as distinguished from printing.

The present invention provides a process whereby matt effects fast to soaping can be produced on lustrous fibres such as viscose both locally by a printing process and in the piece by a padding process by fixation of a white pigment by means of albumen with retention of the original soft feel of the fibres. This process is as follows: a fine suspension of a white pigment containing also a coagulable fixing agent, for example egg albumen, is mixed with a dispersion, especially an emulsion, prepared in a suitable manner from water, a substance which is insoluble or nearly insoluble in water and a dispersing agent, especially an emulsifying agent.

The material is then printed with the paste so obtained—the further addition of a thickening agent being in most cases unnecessary—or is padded with the paste, suitably diluted with water. The fixation of the white pigment on the material is then performed by coagulating the fixing agent according to known methods, such as steaming, vigorously drying, by a treatment in a calcium chloride bath or in the cold by the action of an acid. The material is finally soaped. In this manner matt effects are obtained in which the fibre has an unobjectionable soft feel. The pigment is so well fixed that it does not become detached as dust and is not removed when the material is treated in a hot soap bath.

Emulsions come particularly into consideration as the aforesaid dispersions. Nevertheless suspensions of solid substances in liquids are also applicable in the process of the invention.

In many cases it is advantageous to cause the mixture of the white pigment, the fixing agent and the dispersion (emulsion or suspension) to pass through a suitable emulsifying apparatus.

The invention offers a substantial advantage in that it permits the production of stable padding solutions by means of which viscose in the piece can be matted in a simple manner. Furthermore, considerably smaller quantities of albumen and a white pigment are required than in the hitherto known processes and it is no longer necessary to add substances such as hexamethylenetetramine, Soromin and so on in order to give the fibre a soft feel.

Suitable white pigments are the known inorganic pigments such as titanium oxide ($TiO_2$), zinc oxide, zinc sulphide, barium sulphate and others. Other white pigments such as formaldehyde urea condensation products insoluble in water, cellulose derivatives and others may however also be used.

Instead of albumen, casein may also be used as fixing agent.

As the ingredients of the dispersion which is insoluble or nearly insoluble in water there may be used any substances, alone or in admixture with one another, which yield stable dispersions, especially emulsions, with water alone or in presence of a suitable dispersing agent and if necessary of a stabiliser. It is advantageous, but not absolutely necessary, that the dispersion (emulsion or suspension) should be capable of dilution with water without demixing. Suitable substances are first liquids such as toluene, xylene, higher petroleum fractions, mineral oils, paraffin oils, halogenated hydrocarbons such as tetrachlorethane or trichlorethylene, alcohols of high boiling point, such as octyl alcohol, also fatty substances such as olive oil, castor oil and the like, and secondary semi-solid and solid substances such as vaseline, paraffins, waxes and others to name only a few types.

There come into consideration as dispersing i. e., emulsifying agents those known from the literature (compare for example the Compilation in the work Diserens, Progrès réalisés dans l'application des matières colorantes, vol II, pages 434 et seq.). Reference may be made more particularly to the various soaps and salts of higher fatty acids with alkylolamines among others.

The invention is applicable to lustrous fibres from regenerated cellulose, such as viscose silk and cuprammonium silk, and also to acetate artificial silk, natural silk and others.

The following examples illustrate the invention, the parts being by weight:

Example 1

| | |
|---|---|
| 2 | parts of egg albumen |
| 3 | part of finely powdered titanium oxide |
| 38 | parts of water | are mixed with a previously prepared emulsion containing

| | |
|---|---|
| 25 | parts of water |
| 2.3 | parts Marseilles soap |
| 28.6 | parts of petrol of high boiling point and |
| 1.1 | parts of castor oil |

100 parts.

If required the whole is then passed through an emulsifier. The mass so obtained, which has the consistency of a printing paste, is printed on a lustrous material of regenerated cellulose (viscose) and the printed material is dried, steamed for 8 minutes, washed and if required soaped for 3 minutes at 60° C. Beautiful matt effects are produced and the fibre has a soft feel.

Example 2

| | |
|---|---|
| 1 | part of titanium oxide |
| 1 | part of egg albumen and |
| 36 | parts of water | are incorporated in an emulsion containing

| | |
|---|---|
| 46 | parts of water |
| 1 | part of Marseilles soap |
| 14 | parts of petrol of high boiling point and |
| 1 | part of castor oil |

100 parts.

Lustrous viscose is padded in the bath thus prepared, dried, steamed for 8 minutes, then washed and soaped for 3–5 minutes at 60° C. A good matting effect is thus produced. The original soft feel of the fibre is completely retained.

Example 3

| | |
|---|---|
| 2.25 | parts of stearic acid |
| 0.75 | part of triethanolamine and |
| 74.5 | parts of water | are well stirred and there are then added

| | |
|---|---|
| 22.5 | parts of hard paraffin which has been heated to 90° C. and the whole is thoroughly mixed |

100 parts.

With this suspension there are prepared the following:

| | Printing paste I | Padding solution II |
|---|---|---|
| | Parts | Parts |
| Suspension | 70 | 10 |
| Egg albumen 1:1 | 4 | 2 |
| Titanium oxide 1:1 | 6 | 2 |
| Water | 20 | 86 |
| | 100 | 100 |

Lustrous viscose is printed with the printing paste I, dried and steamed for 8 minutes, after which it is soaped for 3 minutes at 60° C. There are obtained matt effects, the fibre having a very soft feel.

Lustrous viscose or natural silk satin is padded in the padding solution II and is further treated in the same manner as in the above printing prescription. The matted artificial silk or natural silk thus obtained has a very beautiful and soft feel.

A dispersion or emulsion of the kind used in carrying out the invention may also be dried and thus converted into a convenient form for the market. When required for use the powder thus prepared is stirred with the necessary quantity of water. This is illustrated by the following example:

Example 4

A suspension containing paraffin, prepared according to the directions given in Example 3, is dried in the following manner:

| | |
|---|---|
| 3 | parts of the paraffin suspension and |
| 1 | part of egg albumen 1:1 | are intimately mixed by stirring and the whole is dried under reduced pressure at about 40° C. and powdered

| | |
|---|---|
| 2 | parts of the dried powder are slowly made into a paste with |
| 10 | parts of water |
| 2 | parts of titanium oxide 1:1 are added and the whole is diluted with |
| 86 | parts of water |

100 parts.

Viscose is padded in the bath thus prepared and is further treated as described in Example 3. The fibre is well matted and has a soft feel.

Example 5

| | |
|---|---|
| 40 | parts of milk powder (as obtainable in commerce) |
| 2 | parts of egg albumen in the form of powder |
| 5 | parts of titanium oxide paste 1:1 are stirred with |
| 53 | parts of water |

100 parts and if necessary the whole is passed through an emulsifying apparatus. Lustrous viscose is printed with the mass thus obtained, dried, steamed for 8 minutes, washed and soaped. Matt effects are obtained which are fast to soaping.

Example 6

| | |
|---|---|
| 1 | part of soap is dissolved in |
| 32 | parts of water, and to the solution |
| 67 | parts of xylene are added | and the whole is passed through an emulsifying apparatus. A padding bath is prepared from:

| | |
|---|---|
| 15 | parts of the emulsion so obtained with the addition of |
| 2 | parts of egg albumen 1:1 |
| 2 | parts of titanium oxide 1:1 and |
| 81 | parts of water |

200 parts.

Lustrous viscose is padded in this bath, steamed for 8 minutes, soaped for 5 minutes at 60° C. and washed. A good matting is obtained and the fibre has a soft feel.

Example 7

A part of the emulsion used can be replaced by a thickening such as is usual in printing.

- 4 parts of egg albumen 1:1 and
- 6 parts of titanium oxide are introduced whilst stirring into an emulsion consisting of
- 1.6 parts of Marseilles soap
- 17.6 parts of water
- 20 parts of petrol and
- 0.8 part of castor oil.

There are slowly added:
- 20 parts of Carragheen moss thickening (Blandola thickening); (see Ullmann, II edition, vol. III, page 770), and the whole is finally made up with
- 30 parts of water to total 100 parts.

Viscose is printed with this printing paste, dried, steamed for 8 minutes and finally soaped for several minutes at 60° C. Sharply defined matting effects are obtained and the fibre has a very soft feel.

Example 8

The following solution is prepared:
- 8 parts of machine oil and
- 8 parts of oleic acid are mixed together.

To the mixture are added
- 3.7 parts of triethanolamine and
- 80.3 parts of mineral oil 100 parts. This solution is emulsified with
- 60 parts of water.

160 parts 3 parts of the emulsion thus prepared are well mixed with 1 part of a paraffin suspension prepared as indicated in Example 3.

- 50 parts of the mixture of the emulsion with the suspension are mixed with
- 4 parts of egg albumen 1:1
- 6 parts of titanium oxide 1:1 and
- 20 parts of water 100 parts.

Lustrous viscose is printed with the printing paste thus prepared, steamed for 8 minutes and soaped for 3 minutes at 60° C. Beautiful and soft matting effects are obtained.

Example 9

An emulsion containing
- 30.8 parts of water
- 35 parts of petrol
- 2.8 parts of soap and
- 1.4 parts of castor oil 70 parts is mixed with
- 4 parts of egg albumen 1:1
- 10 parts of zinc oxide 1:1 and
- 16 parts of water 100 parts.

Lustrous viscose or natural silk is printed with this paste and further treated as described in Example 8. Good matting effects are obtained.

Example 10

- 70 parts of the emulsion used in Example 9 are mixed with
- 8 parts of egg albumen 1:1
- 6 parts of the water insoluble condensation product from formaldehyde and urea (1:1) prepared as described in the example of Swiss specification No. 202,522 and
- 16 parts of water 100 parts.

By means of this paste good matting effects can be obtained on lustrous viscose in a manner quite similar to that described in Example 8.

Example 11

A printing paste is prepared from
- 70 parts of the emulsion as used in Example 10
- 4 parts of egg albumen 1:1
- 6 parts of titanium oxide 1:1 and
- 20 parts of water 100 parts.

Acetate artificial silk is printed with this paste, dried, steamed for 8 minutes, washed and soaped for 3 minutes. Good white matt effects are obtained.

The steaming operation in the process of the invention has the purpose of coagulating the fixing agent, for example albumen, so that it fixes the matting agent on the fibre. This result can be attained not only by steaming but also by other suitable means, for example by a rigorous drying on a drying drum or by a treatment in a hot calcium chloride bath. These procedures are illustrated by Examples 12 and 13.

Example 12

Lustrous viscose is padded in a bath prepared as described in Example 2. The material is then rigorously dried on a drying drum, during which operation the egg albumen is evidently caused to coagulate. The material is finally soaped for 3 minutes at 60° C. There is obtained a matting which is fast to soaping and has a soft feel.

Example 13

Lustrous viscose is padded in the manner described in Example 12 and dried. It is then treated in a calcium chloride bath maintained at 105° C. and then washed and soaped. In this manner also a good matting which is fast to soaping is obtained.

The matting agent can be fixed not only by a heat treatment but also in other ways, for example in the cold by the action of an acid. This is illustrated by the following example.

Example 14

There is prepared a padding solution of the following composition:

An emulsion containing—
- 0.6 part of soap
- 6.6 parts of water
- 7.5 parts of petroleum and
- 0.3 part of castor oil 15 parts are stirred with
- 10 parts of water and
- 4 parts of egg albumen 1:1 and then with solution of
- 8 parts of barium chloride in
- 63 parts of water 100 parts.

Lustrous viscose is padded in this bath, dried and then treated for some minutes in a bath containing 36 grams of sulphuric acid of 96 per cent strength per litre and maintained at 20° C. (The concentration of the acid and the temperature of this bath may be varied within wide limits.) Barium sulphate is formed as a white pigment on the fibre. The material is soaped as usual. The matting obtained is fast to soaping and the fibre has a soft feel.

Numerous combinations of the white pigments, fixing agents, the components of the dispersions and so on above indicated are possible; all these yield good results although in practice the best and most advantageous combinations will naturally be selected.

It may be stated that the matt effects according to the process of the present invention can also be produced on fibres which have previously been dyed by known methods.

According to a further feature of the present invention the production of the matt effects may be combined with the production of a dyeing. The possibility is thus provided for producing coloured matt effects on a lustrous material by printing or a uniform coloured matting by padding.

The following examples illustrate this feature of the invention, the parts being by weight:

Example 15

The following dyestuff solution I is prepared:

| | Parts |
|---|---|
| The sulphuric acid ester salt of leuco-6-ethoxy-4'-methyl-6'-chlorothioindigo | 0.6 |
| Water | 34.4 |
| Ammonium sulphocyanide solution 1:1 | 1 |
| Sodium chlorate solution 10 per cent | 2 |
| Ammonium vanadate solution 1 per cent | 2 |
| | 40 |

In an emulsifying apparatus the following emulsion II is prepared:

| | Parts |
|---|---|
| Water | 35.5 |
| Soap | 1 |
| Petroleum | 16 |
| Castor oil | 1 |
| Egg albumen | 2.5 |
| Titanium oxide | 6 |
| | 100 |

The solution I and the emulsion II are well mixed together. Lustrous viscose is padded in the padding bath thus prepared, dried and steamed for 8 minutes. It is then washed and soaped for 5 minutes at 60° C.

There is obtained a matt viscose which is dyed in rose shades and has a very soft feel.

Example 16

| | |
|---|---|
| 20 | parts of egg albumen 1:1 |
| 20 | parts of titanium oxide 1:1 and finally |
| 2 | parts of Chlorantin Light Blue GLN (Schultz Farbstofftabellen, 7th edition, No. 617) are added to an emulsion containing |
| 26.5 | parts of water |
| 30 | parts of petrol |
| 2.5 | parts of soap and |
| 1 | part of castor oil. The whole is diluted with |
| 898 | parts of water |
| 1,000 | parts |

Viscose is padded with this bath, dried, steamed for 8 minutes and then lightly soaped. There is obtained a blue dyed matt viscose having a soft feel.

Example 17

Lustrous viscose is padded in the following bath:

Emulsion:

| | |
|---|---|
| 0.5 | parts of soap |
| 5.3 | parts of water |
| 6 | parts of petrol |
| 0.2 | part of castor oil |
| 4 | parts of egg albumen 1:1 |
| 4 | parts of titanium oxide |
| 0.5 | part of the azo-dyestuff from diazotised 2:5-dichloraniline and 2:3-oxy-naphthoic-acid-ortho-anisidide which has been esterified with benzoic-acid-meta-sulphochloride |
| 2 | parts of ethylenethioglycol |
| 5 | parts of urea and |
| 72.5 | parts of water |
| 100 | parts. |

The material is steamed for 8 minutes and then developed for 5 minutes in a bath composed as follows:

| | |
|---|---|
| 20 | parts of barium chloride |
| 50 | parts of caustic soda solution of 60° Bé. |
| 50 | parts of common salt and |
| 880 | parts of water |
| 1,000 | parts. |

The material is then well rinsed, treated for 1 minute at 80° C. in a solution of 5 cc. of hydrochloric acid of 19° Bé. per litre water, rinsed, soaped and again rinsed.

There is obtained a matt viscose which is dyed red.

Example 18

Lustrous viscose is padded in a bath prepared as follows.

To an emulsion containing:

| | |
|---|---|
| 26.5 | parts of water |
| 30 | parts of petrol and |
| 2.5 | parts of soap are added |
| 1 | part of castor oil and then |
| 30 | parts of egg albumen 1:1 and |
| 30 | parts of titanium oxide 1:1. |

After the whole has been well mixed there are added

| | |
|---|---|
| 5 | parts of Chromocitronin R (see Schultz Farbstofftabellen, 7th edition, No. 432) dissolved in |
| 855 | parts of water and |
| 20 | parts of chromium acetate of 20° Bé. |
| 1,000 | parts. |

After padding and drying the material is steamed for 8 minutes, then rinsed, soaped for 5 minutes at 60° C., rinsed and dried. There is obtained a yellow dyed matt viscose having an agreeable soft feel.

Example 19

A padding bath is prepared of the following compositions.

An emulsion containing:

0.6 part of soap
6.6 parts of water
7.5 parts of petroleum and
0.3 part of castor oil 15 parts are mixed with
10 parts of water
4 parts of egg albumen 1:1 and then with
8 parts of barium chloride
1 part of sodium nitrite and
0.1 part of the ester salt of leuco-6-ethoxy-4'-methyl-6'-chlorothioindigo dissolved in
61.9 parts of water 100 parts.

Lustrous viscose is padded in the bath thus prepared, dried, treated for some minutes in a bath containing 36 grams of sulphuric acid per litre and maintained at 20° C., and finally soaped.

Owing to the reaction between barium chloride and sulphuric acid, barium sulphate is formed on the fibre as a white pigment.

There is obtained a matt viscose which is dyed rose shades and has a soft feel.

According to a further feature of the invention the mattings obtainable according to the process of the invention can also be reserved by printing the material with a mechanical resist such as is in customary use, as for example a gum, albumen or a substance similar to albumen, such as glue or the like, drying the material and then padding it with the matting agent and fixing the matting according to the process hereinbefore described.

There are thus obtained lustrous effects on a matt ground. Simultaneously with the application of the resist, dyeings may be produced at the reserved parts of the material according to known methods, whereby coloured lustrous effects are obtained on a matt ground. It will be understood that these lustrous reserve effects on a matt ground can also be produced on materials which have previously been dyed.

It has been shown above that a dyeing may be produced simultaneously with the matting operation. By combining this procedure with the aforesaid reserving process it is possible to obtain coloured lustrous reserve effects on a differently coloured matt ground.

The following examples illustrate this feature of the invention, the parts being by weight:

*Examples 20 and 21*

Lustrous viscose is printed with the following resists:

|  | 20 | 21 |
| --- | --- | --- |
|  | Parts | Parts |
| Glue powder 1:3 | 60 | ------ |
| Starch tragacanth thickening | 20 | ------ |
| Gum arabic 1:1 | ------ | 70 |
| Water | 20 | 30 |
|  | 100 | 100 |

The material is dried and then padded with a padding bath of the following composition:

An emulsion containing:

|  | Parts |
| --- | --- |
| Soap | 0.2 |
| Water | 2.6 |
| Petrol | 3 |
| Castor oil | 0.2 |
|  | 6 |
| Egg albumen 1:1 | 2 |
| Titanium oxide | 2 |
| Water | 90 |
|  | 100 |

The material is dried, steamed for 8 minutes and soaped for 5 minutes at 60° C. Lustrous effects are obtained on a matt ground.

*Examples 22, 23 and 24*

The following printing colours are printed on lustrous viscose:

|  | 22 | 23 | 24 |
| --- | --- | --- | --- |
|  | Parts | Parts | Parts |
| Chromocitronin R (see Schultz Farbstofftabellen, 7th edition, No. 432) | 2 | ------ | ------ |
| The dyestuff described in Example 1 of German specification No. 431,264 | ------ | 2 | ------ |
| The dyestuff described in Example 1 of German specification No. 534,325 | ------ | ------ | 3 |
| Water | 22 | 22 | 21 |
| Gum arabic 1:1 | 70 | 70 | 70 |
| Chromium acetate as free as possible from mineral acid and corresponding with 35 per cent $Cr_2O_3$ | 1.2 | 1.2 | 1.2 |
| Sodium formate | 3 | 3 | 3 |
| Urea | 1.8 | 1.8 | 1.8 |
|  | 100 | 100 | 100 |

The material is dried and steamed for 8 minutes. It is then padded in a padding bath as described in Examples 20 and 21 and again steamed for 8 minutes. It is then washed and soaped.

There are obtained lustrous yellow, red and blue effects on a matt ground.

*Examples 25 and 26*

Lustrous viscose is printed with the following printing colours:

|  | 25 | 26 |
| --- | --- | --- |
|  | Parts | Parts |
| Chromocitronin R (see Schultz Farbstofftabellen, 7th edition, No. 432) | 2 | ------ |
| The dyestuff described in Example 1 of German specification No. 431,264 | ------ | 2 |
| Water | 12 | 12 |
| Gum arabic 1:1 | 69.7 | 69.7 |
| Sodium thiosulphate | 10 | 10 |
| Chromium acetate as free as possible from mineral acid and corresponding to 35 per cent $Cr_2O_3$ | 1.2 | 1.2 |
| Sodium formate | 3 | 3 |
| Urea | 1.8 | 1.8 |
| Oxalic acid | 0.3 | 0.3 |
|  | 100 | 100 |

The material is steamed for 8 minutes and then padded with a solution composed as follows:

| | Parts |
|---|---|
| The ester salt of leuco-4-methyl-5-chloro-7-methoxy-4'-chloro-2-indol-2'-naphthalene-indigo | 1.2 |
| Water | 218.8 |
| An emulsion consisting of: | |
| Soap | 2 |
| Water | 22 |
| Petrol | 25 |
| Castor oil | 1 |
| Egg albumen 1:1 | 6 |
| Titanium oxide 1:1 | 6 |
| Ammoniumthiocyanate solution 1:1 | 6 |
| Sodium chlorate solution 10 per cent | 6 |
| Ammonium vanadate solution 1 per cent | 6 |
| | 300 |

The material is dried, steamed for 8 minutes, washed and soaped for 5 minutes. There are obtained lustrous yellow or red effects on a matt blue ground.

What I claim is:

1. A preparation for matting lustrous fibers and applicable thereto by printing and by padding without imparting a harsh feel to the fibers, said preparation consisting of a minor proportion of a white pigment in finely divided state and a coagulable fixing agent selected from the group consisting of albumen and casein in admixture with a major proportion of a water-miscible dispersion consisting of water, a dispersing agent selected from the group consisting of (a) salts of higher fatty acids with alkylolamines and (b) water-soluble fatty acid soaps, and a substance which is at least substantially insoluble in water and selected from the class consisting of solid hydrocarbons, liquid hydrocarbons of high boiling point, halogenated hydrocarbons of high boiling point, fatty oils, and alcohols of high boiling point.

2. A preparation for matting lustrous fibers and applicable thereto by printing and by padding without imparting a harsh feel to the fibers, said preparation consisting of a minor proportion of titanium oxide pigment in finely divided state and egg albumen in admixture with a major proportion of a water-miscible dispersion consisting of water, a petroleum fraction of high boiling point and Marseilles soap.

3. The production of matt effects on lustrous fibers without imparting a harsh feel thereto, by preparing a dispersion consisting of water, a dispersing agent selected from the group consisting of (a) salts of higher fatty acids with alkylolamines and (b) water soluble fatty acid soaps, and a substance which is at least substantially insoluble in water and selected from the class consisting of solid hydrocarbons, liquid hydrocarbons of high boiling point, halogenated hydrocarbons of high boiling point, fatty oils, and alcohols of high boiling point, admixing the said dispersion with a small proportion of a white pigment in finely divided state and of a coagulable fixing agent selected from the class consisting of albumen and casein, applying the resultant product to the fibres, coagulating the fixing agent, and finally soaping the material.

4. The production of matt effects on lustrous fibers without imparting a harsh feel thereto, by preparing a dispersion consisting of water, a dispersing agent selected from the group consisting of (a) salts of higher fatty acids with alkylolamines and (b) water-soluble fatty acid soaps, and a substance which is at least substantially insoluble in water and selected from the class consisting of solid hydrocarbons, liquid hydrocarbons of high boiling point, halogenated hydrocarbons of high boiling point, fatty oils, and alcohols of high boiling point, admixing the said dispersion with a small proportion of a white pigment in finely divided state and of a coagulable fixing agent selected from the class consisting of albumen and casein, printing the resultant product on the fibers, coagulating the fixing agent, and finally soaping the material.

5. The production of matt effects on lustrous fibers without imparting a harsh feel thereto, by preparing a dispersion consisting of water, a dispersing agent selected from the group consisting of (a) salts of higher fatty acids with alkylolamines and (b) water-soluble fatty acid soaps, and a substance which is at least substantially insoluble in water and selected from the class consisting of solid hydrocarbons, liquid hydrocarbons of high boiling point, halogenated hydrocarbons of high boiling point, fatty oils, and alcohols of high boiling point, admixing the said dispersion with a small proportion of a white pigment in finely divided state and of a coagulable fixing agent selected from the class consisting of albumen and casein, padding the fibers with the resultant product, coagulating the fixing agent, and finally soaping the material.

6. The production of matt effects on viscose silk without imparting a harsh feel thereto, by preparing a dispersion consisting of water, a petroleum fraction of high boiling point, Marseilles soap and a stabilizer for the dispersion, admixing the said dispersion with a small proportion of titanium oxide pigment in finely divided state and of egg albumen, applying the resultant product to the fibers by a printing process, coagulating the egg albumen, and finally soaping the material.

7. The production of matt effects on lustrous fibers without imparting a harsh feel thereto, by preparing an emulsion consisting of water, a dispersing agent selected from the group consisting of (a) salts of higher fatty acids with alkylolamines and (b) water-soluble fatty acid soaps, and a substance which is difficultly soluble in water and is selected from the class consisting of solid hydrocarbons, liquid hydrocarbons of high boiling point, halogenated hydrocarbons of high boiling point, fatty oils, and alcohols of high boiling point, admixing the said emulsion with a small proportion of a white pigment in finely divided state and of a coagulable fixing agent selected from the group consisting of albumen and casein, applying the resultant product to the fibers, coagulating the fixing agent, and finally soaping the material.

8. The production of matt effects on viscose silk without imparting a harsh feel thereto, by preparing a dispersion consisting of water, a petroleum fraction of high boiling point, Marseilles soap and a stabilizer for the dispersion, admixing the said dispersion with a small proportion of titanium oxide pigment in finely divided state and of egg albumen, applying the resultant product to the fibers by a padding process, coagulating the egg albumen, and finally soaping the material.

GEORGES DE NIEDERHÄUSERN.